United States Patent
Sgouros et al.

(10) Patent No.: US 7,720,100 B2
(45) Date of Patent: May 18, 2010

(54) PACKET PRECLASSIFICATION USING SEARCH TREE ALGORITHMS

(75) Inventors: Alexander Sgouros, Raleigh, NC (US); Leonard Bush, Raleigh, NC (US); Christopher Dean Bergen, Cupertino, CA (US); Sourav Chakrabroty, Sunnyvale, CA (US)

(73) Assignee: Applied Micro Circuits Corporation, San Diego, CA (US)

( * ) Notice: Subject to any disclaimer, the term of this patent is extended or adjusted under 35 U.S.C. 154(b) by 507 days.

(21) Appl. No.: 11/801,826

(22) Filed: May 11, 2007

(65) Prior Publication Data
US 2008/0279205 A1    Nov. 13, 2008

(51) Int. Cl.
*H04J 3/00*    (2006.01)
(52) U.S. Cl. .............. 370/474; 370/395.32; 370/395.21
(58) Field of Classification Search .............. 370/230, 370/235, 252, 363, 470, 473, 474, 395.32, 370/395.21, 401; 709/245, 223, 238; 707/2, 707/3, 100
See application file for complete search history.

(56) References Cited

U.S. PATENT DOCUMENTS

| | | | |
|---|---|---|---|
| 7,043,544 B2 * | 5/2006 | Baker et al. | 709/223 |
| 7,277,885 B2 * | 10/2007 | Eppley et al. | 707/3 |
| 2007/0288615 A1 * | 12/2007 | Keohane et al. | 709/223 |

* cited by examiner

*Primary Examiner*—Jason E Mattis
*Assistant Examiner*—Dady Chery
(74) *Attorney, Agent, or Firm*—Law Office of Gerald Maliszewski; Gerald Maliszewski (57) ABSTRACT

An information packet preclassification system and method are provided. The method receives a packet of information and differentiates the packet into segments. Using a decision tree with multiple levels, segments in the packet are compared to a node at a tree level, where each node includes a plurality of node reference segments and corresponding node comparison operators. The reference segment may be a different segment from the packet, or a predetermined segment value stored in memory. One, or more classification attributes are accessed in response to comparing segments, and the classification attributes are assigned to the packet. Then, the packet is processed in response to the classification attributes.

19 Claims, 6 Drawing Sheets

PACKET PRECLASSIFICATION USING SEARCH TREE ALGORITHMS

BACKGROUND OF THE INVENTION

1. Field of the Invention

This invention generally relates to digital packet entity communications and, more particularly, to a system and method for preclassifying packets on receipt, to aid in organization and packet processing.

2. Description of the Related Art

The general concept of classifying packets upon entry into a system or device has been previously implemented in various fashions. Some implementations involve the use of a microprocessor, and classification is done using software. Some implementations involve flexible micro-engines that require a great deal of programming to execute, while other "hard coded" approaches offer a fixed hardware alternative with little flexibility for adapting the device to a user's system. The scope of the classification schemes is often limited and the results are fixed. For example, such a limited scope preclassification scheme may simply determine packet routing in the system based upon the packet quality of service (QOS) level.

It would be advantageous if a means of packet preclassification existed that was flexible and relatively easy to program, permitting system flow grouping or pinning.

SUMMARY OF THE INVENTION

The purpose of the preclassification method and device is to provide a mechanism through which a packet may be preclassified, to determine packet attributes needed for further processing and routing. These attributes can include, but are not limited to: destination queue, memory buffer pool identification, cache policy identification, cache stashing attributes, processor jump pointer to software stack for further processing, memory coherency attributes, priority or QOS indications, IP checksum enable, IP header offsets, TCP/UDP partial checksum enable, TCP/UDP header offset, admission control information, system flow identifier for load balancing of TCP offload operations, and any user-defined preclassification information. These results are achieved in way that is area efficient and programmable, to provide maximum flexibility for the user. In addition, the preclassification device is able to keep up with traffic at the line rate, in order to not artificially stall the flow of traffic.

The system into which the device is integrated drives the requirements for the exact attributes to be derived from classification. In this fashion, the exact database of resulting attributes is fully programmable so that each instance of the invention is able to produce a different set of results. The invention is protocol agnostic and requires a very simple packet type interface. These requirements permit the device to be placed in many different line interfaces with a minimum of adaptation or alteration. One factor that differentiates the preclassification device is that is permits user programming and flexibility, without the need for a full processor or the complexity of coding a micro-engine.

The preclassification device uses search tree and the node formats that are easily understood by a user, providing a byte-by-byte decision model for incoming packets that can be easily programmed. The resulting classification database is fully programmable and the use of a key system to point to a combination of multiple entries permits maximum flexibility. The criteria needed for packet identification and classification can be tailored to fit the application. In addition, the function of identifying or pinning packets to a set of flows permits the user to load balance and fairly process packets.

Accordingly, an information packet preclassification method is provided. The method receives a packet of information and differentiates the packet into segments. Using a decision tree with multiple levels, segments in the packet are compared to a node at a tree level, where each node includes a plurality of node reference segments and corresponding node comparison operators. The reference segment may be a different segment from the packet, or a predetermined segment value stored in memory. One, or more classification attributes are accessed in response to comparing segments, and the classification attributes are assigned to the packet. Then, the packet is processed in response to the classification attributes.

For example, segments may be compared as follows. At a first tree level, a first segment in the packet is compared to reference segments in an intermediate node. Branching to a node in a second tree level occurs in response to the comparisons. Then, a second segment in the packet may be compared to a plurality of reference segments in the second tree level node. If the second tree level node is a last decision node, then a branching occurs to a key node in response to the second tree level comparisons. The classification attributes are discovered by accessing classification pointers in the key node.

Additional details of the above-described method and a system for preclassifying information packets are presented below.

DETAILED DESCRIPTION

Various embodiments are now described with reference to the drawings. In the following description, for purposes of explanation, numerous specific details are set forth in order to provide a thorough understanding of one or more aspects. It may be evident, however, that such embodiment(s) may be practiced without these specific details. In other instances, well-known structures and devices are shown in block diagram form in order to facilitate describing these embodiments.

As used in this application, the terms "processor", "processing device", "component," "module," "system," and the like are intended to refer to a computer-related entity, either hardware, firmware, a combination of hardware and software, software, or software in execution. For example, a component may be, but is not limited to being, a process running on a processor, generation, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Various embodiments will be presented in terms of systems that may include a number of components, modules, and the like. It is to be understood and appreciated that the various systems may include additional components, modules, etc. and/or may not include all of the components, modules etc. discussed in connection with the figures. A combination of these approaches may also be used.

The various illustrative logical blocks, modules, and circuits that have been described may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor. The processor and the storage medium may reside in an ASIC. The ASIC may reside in the node, or elsewhere. In the alternative, the processor and the storage medium may reside as discrete components in the node, or elsewhere in an access network.

Figure 1:
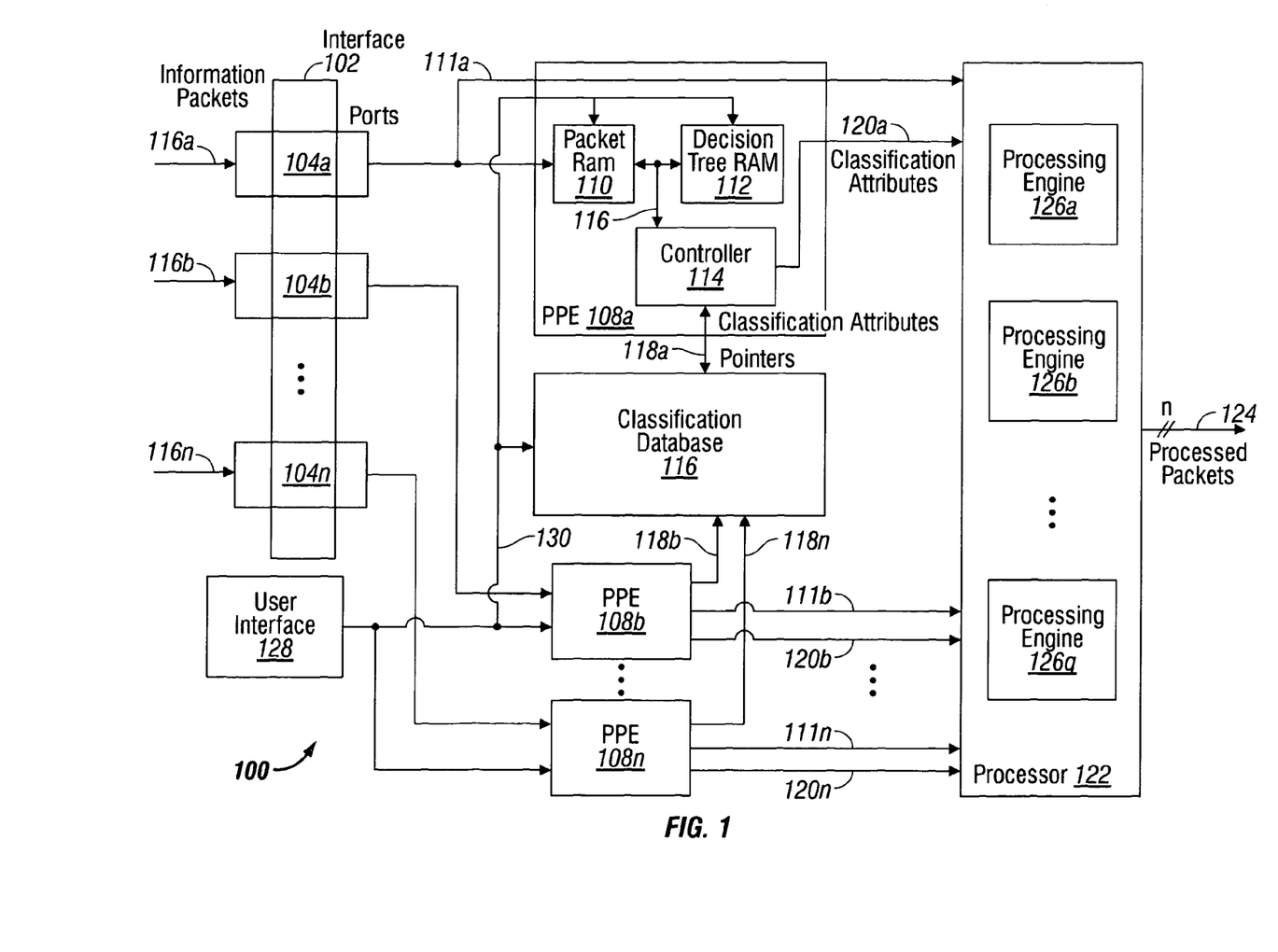
FIG. 1 is a schematic block diagram illustrating a system for preclassifying information packets.

FIG. 1 is a schematic block diagram illustrating a system for preclassifying information packets. The system 100 comprises an input interface 102 with a plurality of ports 104 to accept information packets on line 106. Three ports are shown (n=3) in the figure for simplicity, but n is not limited to any particular number. The system 100 includes a plurality of packet parsing engines (PPEs) 108. Each PPE 108 is connected to a corresponding port to receive a packet and differentiate the packet into segments.

Although only a single PPE 108 is shown in detail (108a), it should be understood that the described features apply to each PPE in the system. PPE 108a includes a packet random access memory (RAM) 110 for storing packet segments received on line 111, and a decision tree RAM 112 for storing a logic decision tree with multiple tree levels. Each node includes a plurality of node reference segments and corresponding node comparison operators. The PPE 108a also includes a controller 114 having an interface on line 116 for accessing the packet RAM 110 and decision tree RAM 112.

The controller 114 uses this access to compare segments in the packet to nodes in the decision tree, and derive classification pointers for the packet.

A classification database 116 has an interface on line 118 to accept classification pointers from the plurality of PPEs 108a through 108n. The classification database supplies classification attributes for packets in response to receiving the classification pointers on line 118, which are received and relayed by the controller 114 on line 120. In one aspect, the PPE controller 114 derives a plurality of classification pointers for a packet, and the classification database 116 assigns a plurality of classification attributes to the packet, in response to receiving the plurality of classification pointers. Some examples of classification attributes include destination queue, memory buffer pool identification, cache policy identification, cache stashing attributes, processor jump pointers to software stack for further processing, memory coherency attributes, priority or QOS indications, IP checksum enable, IP header offsets, TCP/UDP partial checksum enable, TCP/UDP header offset, admission control information, system flow identification for load balancing of TCP offload operations, and other user-defined preclassification information.

A processor 122 has an interface to receive packets on line 111 and classification attributes associated with the packets on line 120. The processor supplies processed packets on line 124 responsive to their respective classification attributes. Exemplary processing operations are described below.

Figure 2:
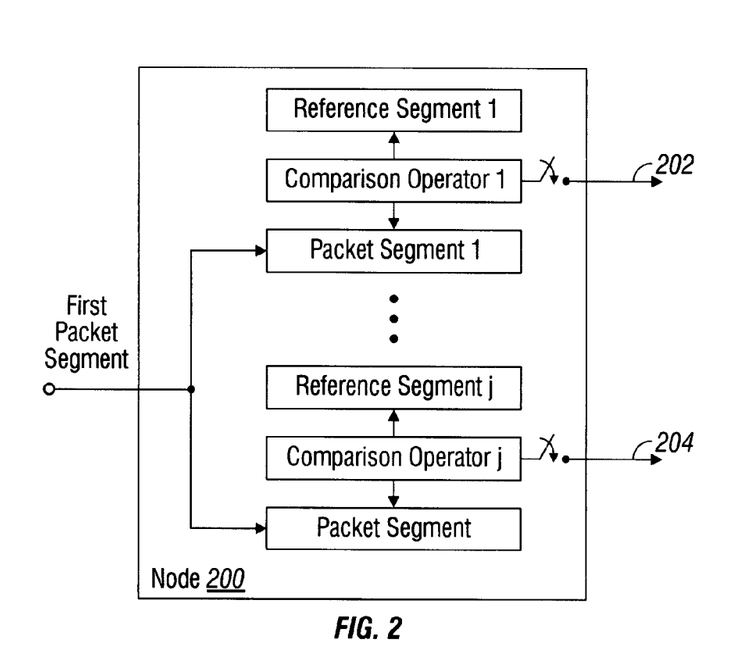
FIG. 2 is a schematic diagram of an exemplary decision tree node in the decision tree RAM of FIG. 1.

FIG. 2 is a schematic diagram of an exemplary decision tree node in the decision tree RAM of FIG. 1. The PPE controller makes a comparison between a first reference segment in the packet and node reference segments. The reference segments may be either a second reference segment in the packet, or a predetermined segment value stored in the logic tree RAM. For example, the controller may act to read a packet segment stored in the packet RAM, and read that value into the decision tree RAM. The packet segment may be a byte or set of bytes from an overhead field in the packet. At node 200, the first packet segment is compared to j reference segments, using j comparison operators. The value of j is not limited to any particular number. However, the values of 4 and 8 are used in the examples that follow. Each reference segment and each comparison operator may, or may not be unique. If one of the comparisons is successful, the logic tree branches to a unique destination in the logic tree associated with the successful comparison. If multiple comparisons are successful, the comparison that is listed first will be taken. This provides an effective if/else comparison model that is a very easy and basic software programming technique.

Figure 3:
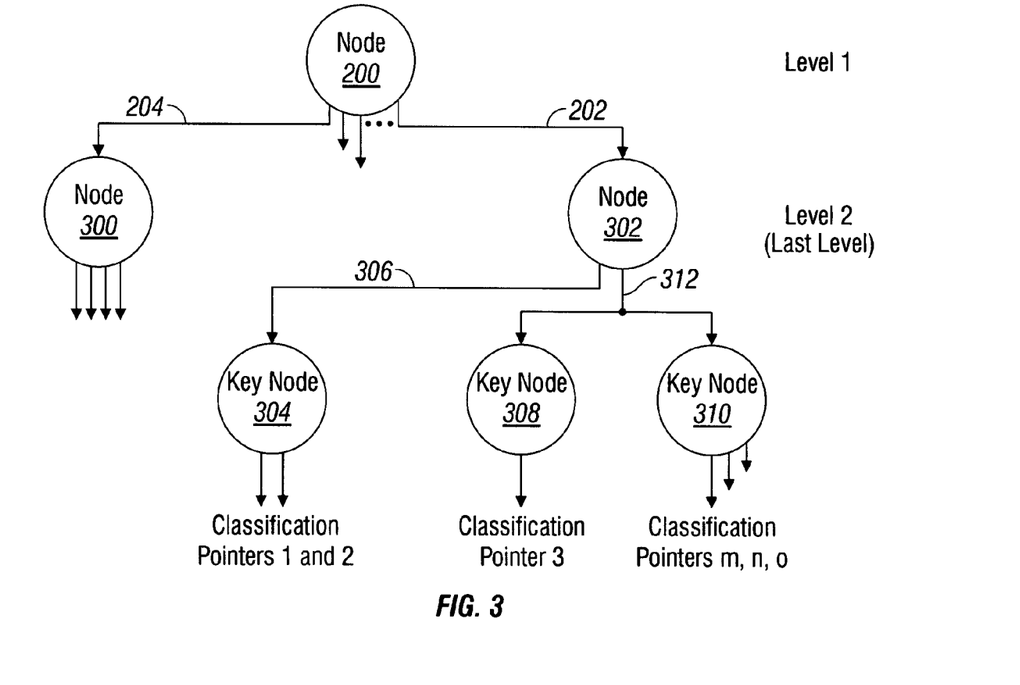
FIG. 3 is a schematic diagram depicting an exemplary decision tree logic structure.

FIG. 3 is a schematic diagram depicting an exemplary decision tree logic structure. As shown, the logic tree, enabled as instructions in the decision tree RAM, includes a first tree level with a node for comparing a first segment in the packet to reference segments in an intermediate node. Node 200 of FIG. 2 is shown as the starting node in tree level 1. Inter-tree level branches 202 and 204 are responsive to comparisons made in the first tree level node, as described above in the explanation of FIG. 2. A second tree level has a node connected to the first tree level node via the inter-tree level branches, for comparing a second segment in the packet to a plurality of reference segments. Here, 2 nodes are shown at the second level, nodes 300 and 302. It should be understood that the packet segment used in the second tree level comparisons is typically different from the packet segment used in the first tree level comparisons. It should also be understood that some branches from the first node 200 may connected to tree levels other that the second tree level.

If the second tree level node is a last decision node, then the logic tree embedded in the RAM includes a key node connected to the last decision node via the inter-tree level branches, for accessing classification pointers. As shown, node 302 is connected to key node 304 via branch 306, for accessing classification pointers 1 and 2. Alternately, depending upon the comparisons conducted in node 302, key nodes 308 and 310 are reached through branch 312, to access classification pointers 3 and m through 0, respectively. The system is not limited to any particular number of destination key nodes or pointers per key node.

Returning to FIG. 1, in one aspect the PPE controller 114 selects a group of packet segments from the packet RAM 110, and creates a chained packet segment from the group of packet segments. Likewise, the controller can access a plurality of chained reference segments from the decision tree RAM 112, and compare the chained packet segment to the plurality of chained reference segments at a tree level node (see FIG. 2). A chained packet segment may include a plurality of bytes, or a collection of bytes from different packet fields.

In another aspect, the PPE controller 114 hashes selected packet segments stored in the packet RAM 110 in response to comparing segments in the packet to nodes in the decision tree. In this aspect the processor 122 includes a plurality of processing engines, 126a through 126q, where q is not limited to any particular number. The processor 122 manages the order of packets to the processing engines 126, in response hashed segment values associated with the packets. For example, the hashed segments may be sent to the processor 122 from the controller 114 on a separate bus (not shown), or with the classification attributes on line 120.

A user interface (UI) 128 may be connected to the decision tree RAM on line 130 for writing reference segments and comparison operators into a tree level node, selecting the number of tree levels, selecting inter-tree levels branches between nodes on different tree levels, selecting classification pointers for key nodes, or selecting the number of classification pointers per key node. The UI 128 may a device that reads instruction stored on a media such as a floppy disk or hard drive. Alternately, the UI 128 may include a keyboard, mouse, and display monitor. The UI 128 may also be connected to the packet RAM 110 for selecting segments in a packet to be written. Further, the UI 128 can be used to load, update, or modify classification attributes in the classification database 116.

Functional Description

Preclassification is an important first step in the ingress flow of the many network system-on-chips (SOCs). The first point of entry for traffic into the device is a logical first semi-intelligent decision point in the SOC. Preclassification may be used to route traffic into the SOC with the correct destination, class of service, and other SOC attributes. It can also perform simple SOC processor load balancing for TCP termination, especially in SOCs that do not incorporate hardware processing assist engines. Thus, a preclassification engine can be used at any entry point into the SOC that has packet-based behavior that can be modified, such as with Ethernet or PCI Express (PCIe) packets for example.

A preclassification engine can consist of a software-compiled tree of decisions and data comparisons to incoming packets. As packet data streams through the engine, it is stored locally (e.g., 256B is typically sufficient). The hardware walks down a tree of decisions and compares data at each node of the tree to any segment of packet data. For example, a packet segment may be 2 bytes (Bs) of data. Each tree branch eventually leads to a final key node, which has a set of pointers to retrieve a preclassification result from a user programmed database. This database includes information to route the packet in the SOC, such as queue number, buffer pool, priority, caching attributes, etc. These functions are generally referred to as processing in the description of FIG. 1. The preclassification design can be used for both 10 Gbps Ethernet ports and triple speed 10/100/1000 Ethernet ports, without changes to the core design.

Figure 4:
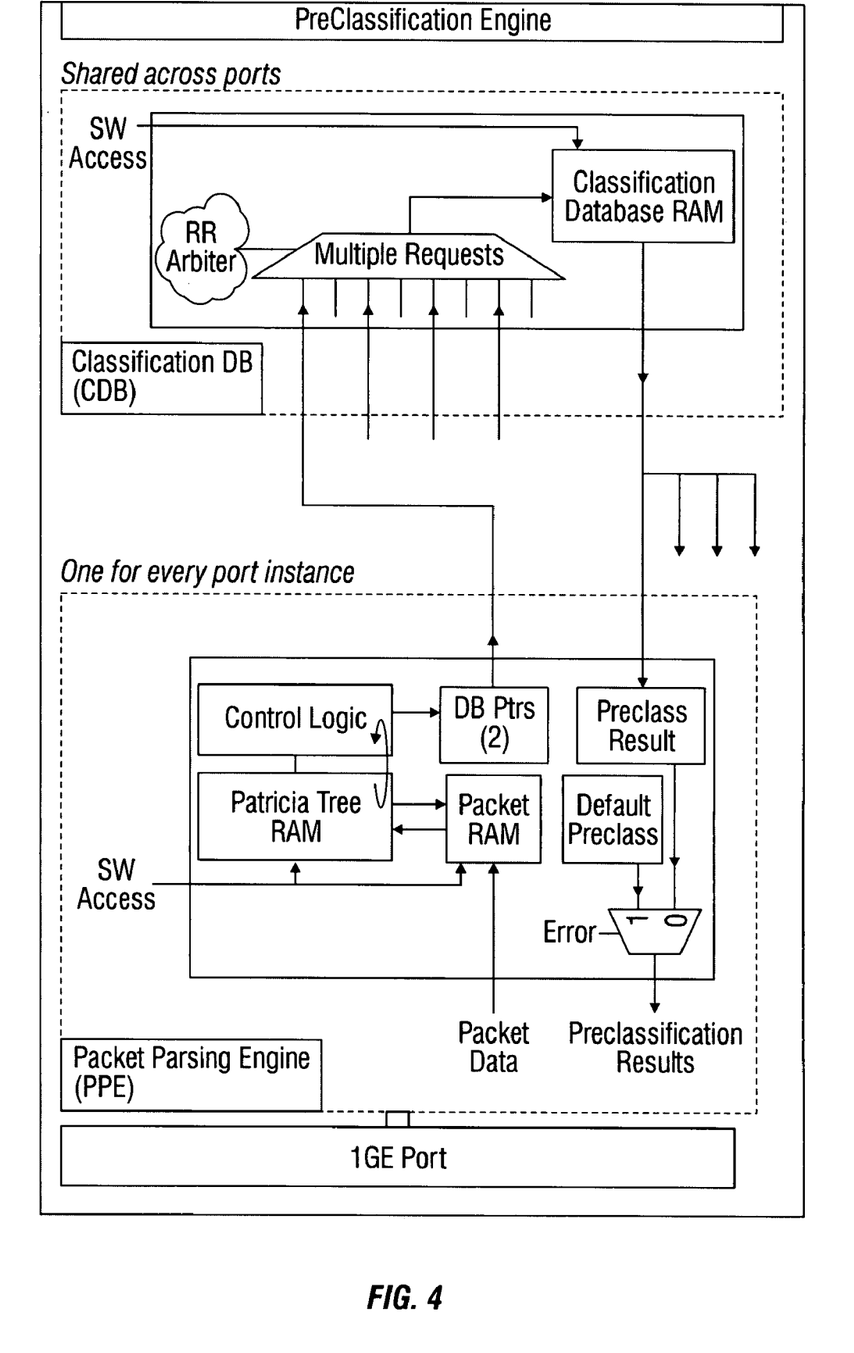
FIG. 4 is a schematic block diagram depicting a variation of the preclassification system presented in FIG. 1.

FIG. 4 is a schematic block diagram depicting a variation of the preclassification system presented in FIG. 1. The explanations of FIGS. 4 through 6 describe one specific example of the invention. The invention is not necessarily limited to the specific details presented in the explanation of these figures. An Ethernet version of the preclassification engine consists of 2 major pieces: a Packet Parsing Engine (PPE) and a classification database. A decision tree (e.g., a Patricia tree) portion is allocated on a per port basis, and the classification database section may be shared among multiple ports. The Patricia tree blocks operate independently of each other and request classification result lookups from a common database block. The number of connections that the database component can handle is determined by the speed of the Patricia tree portions. The classification database may be shared amongst all ports with the results put together in a wrapper. A simple Work Conserving Round Robin port arbiter may be used to grant access to the database. Since the Packet Parsing Engine is a 2-byte engine in this example, it performs all operations on that size of quanta. Packet data is stored in the same quanta size as processed by the engines.

The following is a summary of the functions that may be performed by an exemplary version of the preclassification engine. The preclassification engine is able to keep up with line rate traffic and inspect 100% of each packet. A flexible storage element is provided for programming a Patricia tree algorithm that can store many entries. In the example provided below, 128 entries can be stored. The node design is also flexible. For example, each entry can store either: 1 8-way decision node, 2 4-way decision nodes, or a key node. 4-way and 8-way decision/branch nodes are also provided, and up to 24 sets of key pointers per key node can be supported. Mask values (reference segments) and command (comparison) operators are supplied for each decision branch. In this example, 4 data comparison operators are supported. The operators are: equal to, not equal to, less than equal to, greater than equal to. Also, 2 bitwise logic operators (AND, NAND) can be established in each decision branch. However, other operators may also be used.

The decision nodes may compare either incoming packet data, or up to 16 pre-programmed 2B values stored in the packet RAM. The chaining of comparisons from node to node is supported by using the previous node best match against the current node. A function is provided to store any byte in a packet that has been inspected by a node, in order to use along with the programmed port number for a final key node pointer. An 8-bit hash value for up to a 12 B hash of any sequential combination of 2 B quanta of data (6 max) can be provided using the Ethernet/AAL5 CRC32 polynomial function: $1+x1+x2+x4+x5+x7+x8+x10+x11+x12+x16+x22+x23+x26+x32$, to name one exemplary algorithm.

Packet data may be parsed 2B at a time and moved from node to node in the programmed Patricia Tree in a single clock. Jumping forwards or backwards to any 2 B of the packet is supported (up to first 256 B) for parsing. Default key pointers may be provided at each node in the event of a parity error or other critical error at that stage in processing. Up to 512 sets classification entries and return results are supported, along with an 8-bit hash value. A set of default preclassification entries can be provided in the event of a parity error with the requested entry. A software mechanism may be used to dynamically update the Patricia Tree RAM, the classification database, and the packet RAM to change user-defined compare values.

Figure 5:
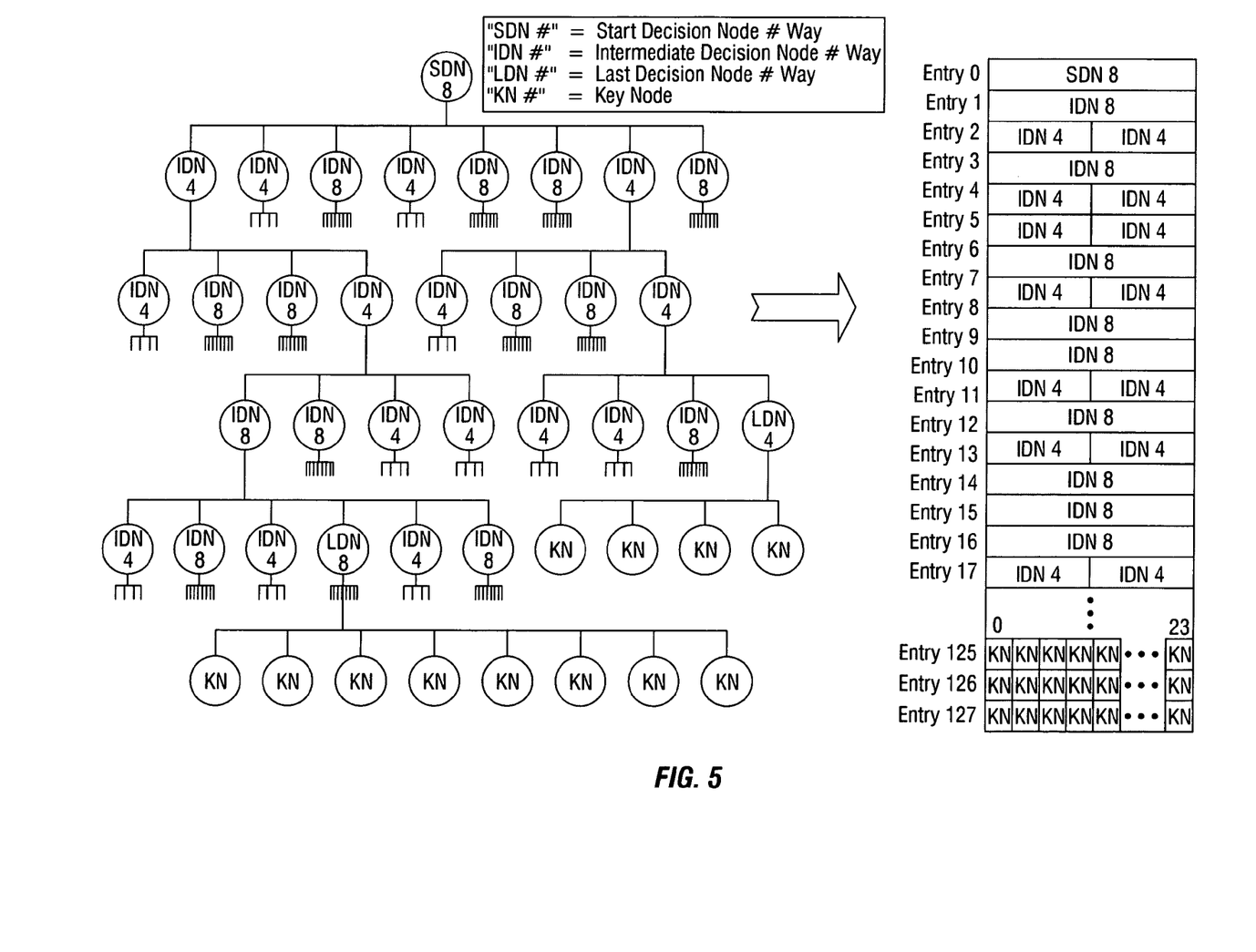
FIG. 5 is a schematic diagram depicting a detailed exemplary Patricia tree.

FIG. 5 is a schematic diagram depicting a detailed exemplary Patricia tree. The hardware in the preclassification engine may be programmed with a pseudo Patricia tree type algorithm. Each node in the tree is a Starting Decision Node, an Intermediate Decision Node, a Last Decision Node, or a Key Node. The tree begins with a Starting Decision Node (or parent node), which has up to 8 possible branches. The branch taken depends upon a series of comparisons between compare data stored in the decision node, and streaming or stored packet data. In this example, the engine supports the four comparison operators and two bitwise logical operators mentioned above. The bitwise logical operators AND, and NAND include a final OR reduction. The portion of the packet being compared is programmed in the decision node in the form of a jump pointer. As every 2 B segment of the packet streams by, the engine writes this data into a packet RAM. The jump pointer indicates which 2 bytes are used to compare against the data in each of the available branches. The jump pointer can point forwards into the packet, backwards into the packet, or reference the current 2 B segment streaming in. In addition, the jump pointer can also point to user-configured static data, which is also stored in the packet RAM. The first branch programmed in the entry with the correct match is taken. Up to the first 256 B of the packet can be stored locally by the engine.

Intermediate Nodes are used to walk down the Patricia tree until a Last Decision (Final) Node is reached. At this node, the engine uses a configured port number and a stored byte of the packet for comparison against. This final comparison leads to a pointer for the final Key Node. Once the Key Node is reached, a pair of key pointers is read out and further decisions cease. The engine stops writing the packet into the local memory at this point. The 2 key pointers are to look up 2 separate classification entries in a database. Each entry in the database provides information such as destination queue number in the SOC, free buffer pool id, Packet Cache policy bits, Final admit/drop decision, coherency attributes, and other user-defined preclassification information for the downstream processing elements.

Each node in the Patricia tree is stored in a local memory called the decision tree or PreClass RAM. This RAM has a total of 128 entries into which the tree must be compiled. Each entry in the memory can be one of 3 types: an 8-way or 8-branch decision node, 2 sets of 4-way or 4-branch decision nodes, or a key node. Each decision node in the tree can have up to 8 branches as stated earlier. If a node has 4 or less branches it can be compressed into one entry with any other node that has 4 or less branches. Key nodes can store up to 25 groups of keys. Any combination of the 4 or 8 way branch nodes and key nodes can be used as long as the following holds true: there are a maximum of 128 entries in the RAM, there must be at least 2 decision node types, there must be at least one entry of key node type.

As mentioned previously, there are 3 types of decision nodes and 1 type of key node. All nodes have a valid/type field for that entry. An 8-way decision node has a set of default key pointers that are used in the event of a parity error for that entry, or any other error event at that stage in the tree. In addition, a next jump pointer is placed in the entry to point to the next 2 B in the packet that must be compared. Jump pointers are programmed in a 2 B granularity.

A Last Node indication field is present in each decision node to state whether this node is the last decision node. Also, a 2-bit Byte Store field will be used to tell the engine whether to store off a byte from the current 2 B of data to be used later in the Last Decision Node. In addition, a single bit Hash Store field is present to denote whether the current 2 B is to be added to the Hash Vector to be hashed.

A Chain Comparison bit is in the node format as well to indicate whether the current node comparison should be chained with the next node. This chaining permits a user to make a multi-word comparison decision instead of using just a single 16-bit word. The chaining together of nodes is unlimited as each node takes the previous node decision as input for the current node's decision branch.

Finally, 8 sets of branch fields consisting of 16-bit masks and compare data, an operation command type, and a 12-bit next node decision pointer are programmed in an 8-way entry. A 4-way decision node entry is made up of 2 sets of node information. It has a default set of key pointers, next jump pointer, Byte Store, and Last Node indication for each of the 2 nodes, as well as 4 sets of branch fields (mask, compare data, and next pointers) for each of the two 4-way nodes. Each set of branch fields in both 8-way and 4-way entries represent a potential branch in the tree. Each set has a valid bit associated with it to denote whether that branch is valid or not.

The key node entry consists of 24 sets of 2 key pointers. These 2 pointers are used to look up 2 classification entries in the Classification Database. The decision to have 2 types of decision node pointers, and to store all decision node entries and key node entries in one RAM, permits a user maximum flexibility in creating a custom algorithm per engine.

The hashing function employed in the exemplary preclassification engine is a CRC-32/AAL5 standard hash. The engine can store up to 12 B to be hashed. Once the Last Decision node is reached, the engine takes however many bytes have been accumulated for hashing and performs a single clock cycle hash. This is done by taking the first 32-bit segment and the second 32-bit segment, and hashing them together producing a 32 bit result. This result, in turn, is hashed with the final and third 32 bits to produce a final 32 bit hash value. The user can then statically select which of the 4 groups of 8-bits the engine is to pass on for the final hash index value result. The 12 B hash is meant as an example, and the invention is not limited to any particular number. The length of the hash is flexible, based on minimum packet size.

This hashing function is used to group together data belonging to the same flow or set of flows. The user can hash on any set of bytes in the packet, which may include, but is not limited to, such fields as: MAC Destination or Source Addresses, TCP/IP Source and Destination fields, UDP Source and Destination fields, VLAN information, etc. By using a fixed set of fields to hash on, the engine can produce an identifier for that "flow" of data. This identifier can be used to help load balance and route the packet to various processing elements downstream.

Figure 6:
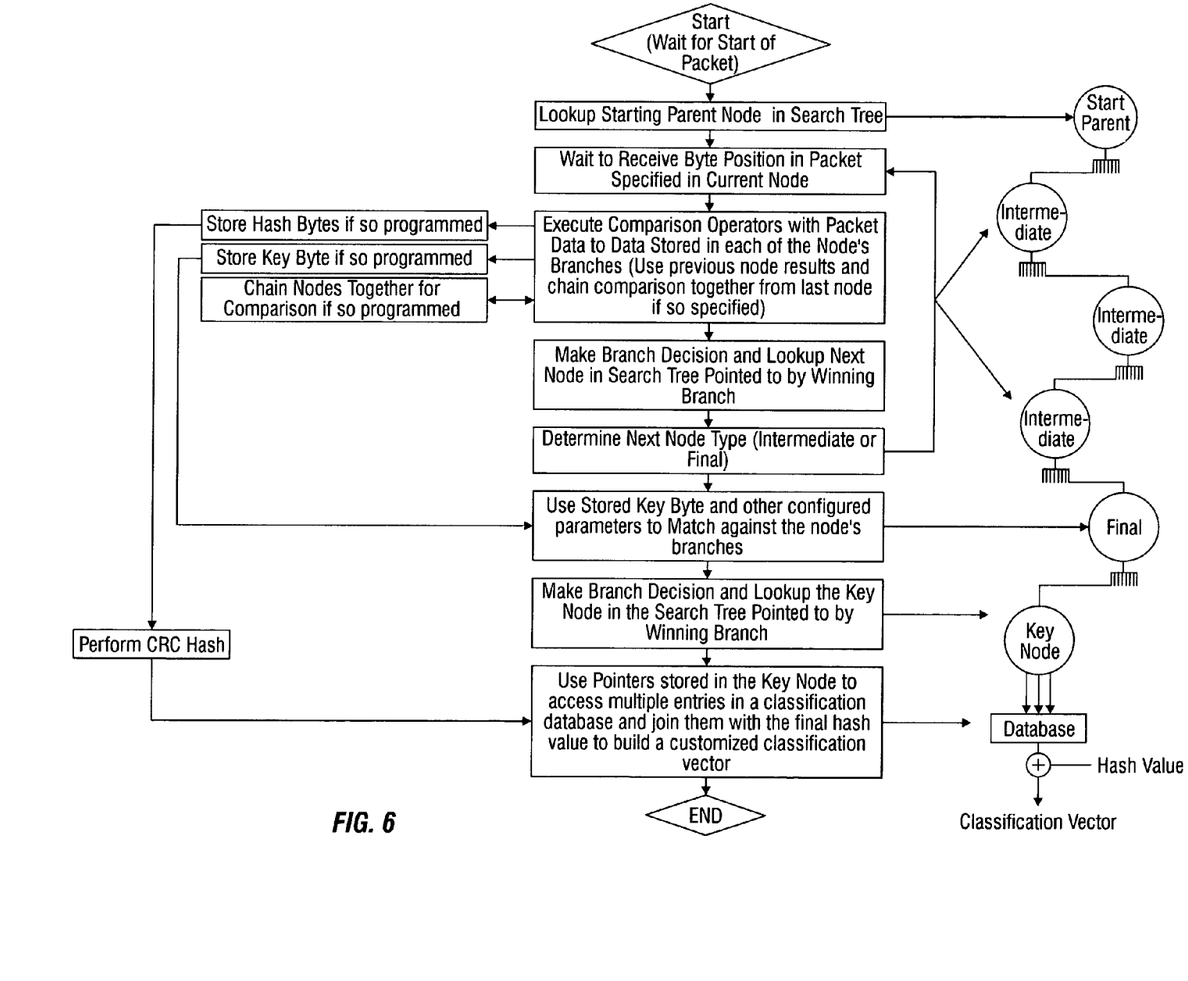
FIG. 6 is a detailed flowchart illustrating steps in navigating through an exemplary Patricia tree algorithm.

FIG. 6 is a detailed flowchart illustrating steps in navigating through an exemplary Patricia tree algorithm. The Start Decision Node (Node A) is an 8-branch node with a Jump to EtherType/Length Field in packet (2-bytes). The packet data or packet segment=0x95. The following is a list to the reference segments and their respective comparison operators:

Branch 1 Field: Mask="FF", Operator="<=", Compare Data=0x10;
Branch 2 Field: Mask="FF", Operator="<=", Compare Data=0x30;

Branch 3 Field: Mask="FF", Operator="<=", Compare Data=0x50;
Branch 4 Field: Mask="FF", Operator="<=", Compare Data=0x70;
Branch 5 Field: Mask="FF", Operator="<=", Compare Data=0x90;
Branch 6 Field: Mask="FF", Operator="<=", Compare Data=0xA0 (Winner)→Branch goes to Node B (This is the 1$^{st}$ branch to match);
Branch 7 Field: Mask="FF", Operator="<=", Compare Data=0xC0; and,
Branch 8 Field: Mask="FF", Operator="<=", Compare Data=0xFF.

The Intermediate Decision Node (Node B) is an 8-branch node with a Jump to VLAN COS field in packet (3-bits). The packet data=0x6. The following is a list to the reference segments and their respective comparison operators:
Branch 1 Field: Mask="07", Operator="=", Compare Data=0x00;
Branch 2 Field: Mask="07", Operator="=", Compare Data=0x01;
Branch 3 Field: Mask="07", Operator="=", Compare Data=0x02;
Branch 4 Field: Mask="07", Operator="=", Compare Data=0x03;
Branch 5 Field: Mask="07", Operator="=", Compare Data=0x04;
Branch 6 Field: Mask="07", Operator="=", Compare Data=0x05;
Branch 7 Field: Mask="07", Operator="=", Compare Data=0x06 (Winner)→Branch goes to Node C; and,
Branch 8 Field: Mask="07", Operator="<=", Compare Data=0x07.

The Intermediate Decision Node (Node C) is an 8-branch node with a Jump to VLAN Type Field in packet (10-bits). The packet data=0x51. The following is a list to the reference segments and their respective comparison operators:
Branch 1 Field: Mask="3F", Operator="=", Compare Data=0x50;
Branch 2 Field: Mask="3F", Operator="=", Compare Data=0x51 (Winner)→Branch goes to Node D (branch 8 also matches but this is the 1$^{st}$ match);
Branch 3 Field: Mask="3F", Operator="=", Compare Data=0x52;
Branch 4 Field: Mask="3F", Operator="=", Compare Data=0x53;
Branch 5 Field: Mask="3F", Operator="=", Compare Data=0x54;
Branch 6 Field: Mask="3F", Operator="=", Compare Data=0x55;
Branch 7 Field: Mask="3F", Operator=">=", Compare Data=0x50; and,
Branch 8 Field: Mask="07", Operator="<=", Compare Data=0x49.

The Intermediate Decision Node (Node D) is an 8-branch node with a Jump to IP Version/Length/TOS Fields. The 2nd byte (TOS) is stored for the Key Byte. Packet data=0x00. The following is a list to the reference segments and their respective comparison operators:
Branch 1 Field: Mask="FF", Operator="!=, Compare Data=0x00 (Winner)→Branch goes to Node E (branch 8 also matches but this is the 1$^{st}$ match);
Branch 2 Field: Mask="FF", Operator="=", Compare Data=0x01;
Branch 3 Field: Mask="FF", Operator="=", Compare Data=0x02;
Branch 4 Field: Mask="FF", Operator="=", Compare Data=0x03;
Branch 5 Field: Mask="FF", Operator="=", Compare Data=0x04;
Branch 6 Field: Mask="FF", Operator="=", Compare Data=0x05;
Branch 7 Field: Mask="FF", Operator="=", Compare Data=0x06; and,
Branch 8 Field: Mask="00", Operator="=", Compare Data=0x00.

The Intermediate Decision Node (Node E) is a 4-branch node with a Jump to IP Protocol Field (8-bits). The packet data=0x1F. The following is a list to the reference segments and their respective comparison operators:
Branch 1 Field: Mask="FF", Operator="<=", Compare Data=0x3F (Winner)→Branch goes to Node F (This is the 1$^{st}$ branch to match);
Branch 2 Field: Mask="FF", Operator="<=", Compare Data=0x7F;
Branch 3 Field: Mask="FF", Operator="<=", Compare Data=0xBF; and,
Branch 4 Field: Mask="FF", Operator="<=", Compare Data=0xFF.

The Intermediate Decision Node (Node F) is a 4-branch node with a Jump to IP Source Field (1st two bytes). 2 bytes are stored for hash. The packet data=0x5E. The following is a list to the reference segments and their respective comparison operators:
Branch 1 Field: Mask="FF", Operator="<=", Compare Data=0x3F;
Branch 2 Field: Mask="FF", Operator="<=", Compare Data=0x7F (Winner)→Branch goes to Node G (This is the 1$^{st}$ branch to match);
Branch 3 Field: Mask="FF", Operator="<=", Compare Data=0xBF; and,
Branch 4 Field: Mask="FF", Operator="<=", Compare Data=0xFF.

The Intermediate Decision Node (Node G) is a 4-branch node with a Jump to IP Source Field (2nd two bytes). 2 bytes are stored for hash. The packet data=0x96. The following is a list to the reference segments and their respective comparison operators:
Branch 1 Field: Mask="FF", Operator="<=", Compare Data=0x3F;
Branch 2 Field: Mask="FF", Operator="<=", Compare Data=0x7F;
Branch 3 Field: Mask="FF", Operator="<=", Compare Data=0xBF (Winner)→Branch goes to Node H (This is the 1$^{st}$ branch to match); and
Branch 4 Field: Mask="FF", Operator="<=", Compare Data=0xFF.

The Intermediate Decision Node (Node H) is a 4-branch node with a Jump to IP Destination Field (1st two bytes). 2 bytes are stored for hash. The packet data=0x16. The following is a list to the reference segments and their respective comparison operators:
Branch 1 Field: Mask="FF", Operator="<=", Compare Data=0x3F (Winner)→Branch goes to Node J (This is the 1$^{st}$ branch to match);
Branch 2 Field: Mask="FF", Operator="<=", Compare Data=0x7F;
Branch 3 Field: Mask="FF", Operator="<=", Compare Data=0xBF; and,
Branch 4 Field: Mask="FF", Operator="<=", Compare Data=0xFF.

The Intermediate Decision Node (Node J) is a 4-branch node with a Jump to IP Destination Field (2nd two bytes). 2 bytes are stored for hash. The packet data=0xC6. The following is a list to the reference segments and their respective comparison operators:

Branch 1 Field: Mask="FF", Operator="<=", Compare Data=0x3F;
Branch 2 Field: Mask="FF", Operator="<=", Compare Data=0x7F;
Branch 3 Field: Mask="FF", Operator="<=", Compare Data=0xBF; and,
Branch 4 Field: Mask="FF", Operator="<=", Compare Data=0xFF (Winner)→Branch goes to Node K (This is the 1$^{st}$ branch to match).

The Intermediate Decision Node (Node K) is a 4-branch node with a Jump to TCP Source Port Field. 2 bytes are stored for hash. The packet data=0x54. The following is a list to the reference segments and their respective comparison operators:

Branch 1 Field: Mask="FF", Operator="<=", Compare Data=0x3F;
Branch 2 Field: Mask="FF", Operator="<=", Compare Data=0x7F (Winner)→Branch goes to Node L (This is the 1$^{st}$ branch to match);
Branch 3 Field: Mask="FF", Operator="<=", Compare Data=0xBF; and,
Branch 4 Field: Mask="FF", Operator="<=", Compare Data=0xFF.

The Intermediate Decision Node (Node L) is a 4-branch node with a Jump to TCP Destination Port Field. 2 bytes are stored for hash. The packet data=0x78. The following is a list to the reference segments and their respective comparison operators:

Branch 1 Field: Mask="FF", Operator="<=", Compare Data=0x3F;
Branch 2 Field: Mask="FF", Operator="<=", Compare Data 0x7F (Winner)→Branch goes to Node M (This is the 1$^{st}$ branch to match);
Branch 3 Field: Mask="FF", Operator="<=", Compare Data=0xBF; and,
Branch 4 Field: Mask="FF", Operator="<=", Compare Data=0xFF.

The Last Decision Node (Node M) is an 8-branch node. A Key Byte is stored and Port Number is used to find a Key Node. The Hash calculation is started in this node. The packet data=0x20. The following is a list to the reference segments and their respective comparison operators:

Branch 1 Field: Mask="FF", Operator="=", Compare Data=0x20 (Winner)→Branch goes to KEY Node N;
Branch 2 Field: Mask="0F", Operator="=", Compare Data=0x04;
Branch 3 Field: Mask="0F", Operator="=", Compare Data=0x08;
Branch 4 Field: Mask="0F", Operator="=", Compare Data=0x0A;
Branch 5 Field: Mask="FF", Operator="=", Compare Data=0x18;
Branch 6 Field: Mask="FF", Operator="=", Compare Data=0x20;
Branch 7 Field: Mask="FF", Operator="=", Compare Data=0x30; and,
Branch 8 Field: Mask="00", Operator=">=", Compare Data=0x30.

The Key Node N has 2 pointers that are accessed. A classification database lookup request is made using these 2 pointers. The Hash result is finished, and the process returns with classification results (attributes) and the Hash value.

Figure 7:
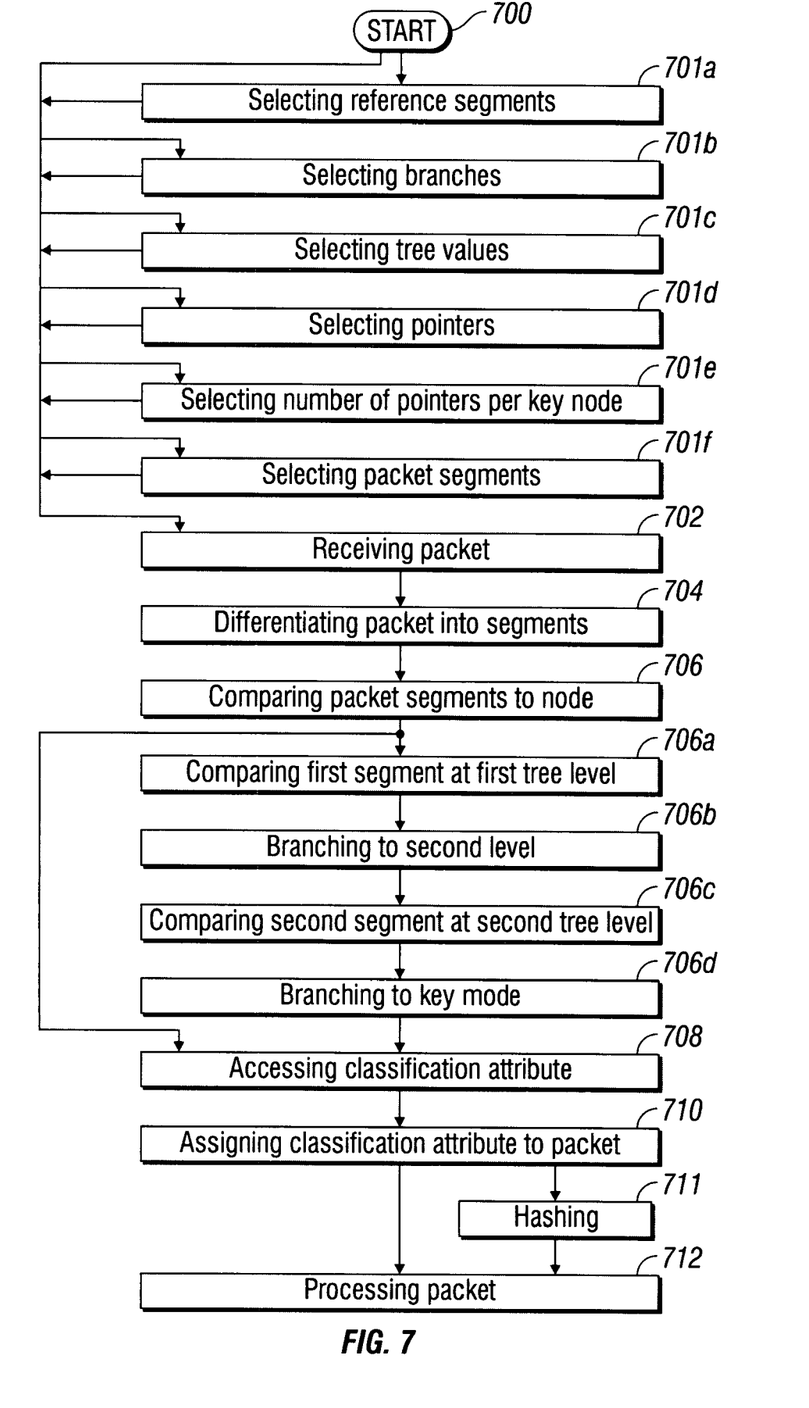
FIG. 7 is a flowchart illustrating an information packet preclassification method.

FIG. 7 is a flowchart illustrating an information packet preclassification method. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. The method starts at Step 700.

Step 702 receives a packet of information. Step 704 differentiates the packet into segments. Using a decision tree with multiple levels, Step 706 compares segments in the packet to a node at a tree level, where each node includes a plurality of node reference segments and corresponding node comparison operators. In response to comparing segments, Step 708 accesses a classification attribute. Step 710 assigns the classification attribute to the packet, and Step 712 processes the packet in response to the classification attribute.

In one aspect, accessing the classification attribute in Step 708 includes accessing a plurality of classification attributes, and assigning the classification attribute to the packet in Step 710 includes assigning a plurality of classification attributes to the packet.

In another aspect, comparing segments in Step 706 includes making a comparison between a first reference segment in the packet and node reference segments, which may be either a second reference segment in the packet or a predetermined segment value stored in memory.

More explicitly, comparing segments may include the following substeps. Step 706a compares a first segment in the packet to reference segments in an intermediate node at a first tree level. In response to the comparisons, Step 706b branches to a node in a second tree level. Step 706c compares a second segment in the packet to a plurality of reference segments in the second tree level node.

In one aspect, branching to the node in the second tree level (Step 706b) includes branching to a last decision node. Then, Step 706d branches to a key node in response to comparing the second segment in the packet to the last decision node (Step 706c). Accessing the classification attribute in response to the decision tree comparisons (Step 708) includes accessing classification pointers in the key node.

In another aspect, comparing segments in Step 706 includes: selecting a group of packet segments; creating a chained packet segment from the group of packet segments; and, comparing the chained packet segment to a node including a plurality of chained reference segments.

In a different aspect, Step 711 hashes selected segments in the packet. Then, processing the packet in response to the classification attribute (Step 712) includes managing a flow of packets to a plurality of processors in response hashed segment values in the packet.

In one aspect, Step 701a selects (writes) reference segments for a node prior to receiving the packet in Step 702. Likewise, Step 701b selects branches between nodes on different tree levels, and Step 701c selects the number of tree levels. Step 701d selects classification pointers for a key node, Step 701e selects the number of classification pointers per key node, and Step 701f selects segments in the packet to be compared.

A preclassification system and method have been provided for packet information. Detailed examples of algorithms using a specific number of nodes, tree organization, and byte segments have been presented to illustrate the invention. Likewise, specific classification attributes and packet processing results have been presented. However, the invention is not limited to these examples. Other variations and embodiments of the invention will occur to those skilled in the art.

We claim:

1. An information packet preclassification method comprising:
an input interface port receiving a packet of information;
a packet parsing engine (PPE) differentiating the packet into segments;
using a PPE decision tree random access memory (RAM) including a logic decision tree with multiple levels, a PPE controller comparing segments in the packet to a node at a tree level, where each node includes a plurality of node reference segments and corresponding node comparison operators, the PPE controller:
in a first tree level, comparing a first segment in the packet to reference segments in an intermediate node;
in response to the comparisons, branching to a node in a second tree level; and,
comparing a second segment in the packet to a plurality of reference segments in the second tree level node;
in response to comparing segments, the PPE accessing a classification attribute in a classification database; and,
the PPE assigning the classification attribute to the packet.

2. The method of claim 1 further comprising:
a processor processing the packet in response to the classification attribute.

3. The method of claim 2 wherein the PPE controller hashes selected segments in the packet; and,
wherein processing the packet in response to the classification attribute includes managing a flow of packets to a plurality of processors in response hashed segment values in the packet.

4. The method of claim 1 wherein accessing the classification attribute includes accessing a plurality of classification attributes; and,
wherein assigning the classification attribute to the packet includes assigning a plurality of classification attributes to the packet.

5. The method of claim 1 wherein comparing segments includes making a comparison between a first reference segment in the packet and node reference segments selected from a group consisting of a second reference segment in the packet and a predetermined segment value stored in memory.

6. The method of claim 1 wherein branching to the node in the second tree level includes branching to a last decision node;
wherein comparing segments further includes branching to a key node in response to comparing the second segment in the packet to the last decision node; and,
wherein accessing the classification attribute in response to the decision tree comparisons includes accessing classification pointers in the key node.

7. The method of claim 6 wherein comparing segments includes:
selecting a group of packet segments;
creating a chained packet segment from the group of packet segments; and,
comparing the chained packet segment to a node including a plurality of chained reference segments.

8. The method of claim 6 further comprising:
a UI, the UI, prior to receiving the packet:
selecting classification pointers for a key node; and,
selecting the number of classification pointers per key node.

9. The method of claim 1 further comprising:
a user interface (UI), the UI, prior to receiving the packet:
selecting reference segments for a node;
selecting comparison operators for a node;
selecting branches between nodes on different tree levels; and,
selecting the number of tree levels.

10. The method of claim 1 further comprising:
a UI, the UI, prior to receiving the packet, selecting segments in the packet to be compared.

11. A system for preclassifying information packets, the system comprising:
an input interface with a plurality of ports to accept information packets;
a plurality of packet parsing engines (PPEs), each PPE connected to a corresponding port to receive a packet and differentiate the packet into segments, the PPE including:
a packet random access memory (RAM) for storing packet segments;
a decision tree RAM for storing a logic decision tree with multiple tree levels, where each node includes a plurality of node reference segments and corresponding node comparison operators, wherein the logic tree in RAM includes:
a first tree level with a node for comparing a first segment in the packet to reference segments in an intermediate node;
inter-tree level branches, responsive to comparisons made in the first tree level node; and,
a second tree level with a node connected to the first tree level node via the inter-tree level branches, for comparing a second segment in the packet to a plurality of reference segments; and,
a controller having an interface for accessing the packet RAM and decision tree RAM, for comparing segments in the packet to nodes in the decision tree, and deriving classification pointers for the packet; and,
a classification database having an interface to accept classification pointers from the plurality of PPEs, and an output to supply classification attributes for packets in response to receiving the classification pointers.

12. The system of claim 11 further comprising:
a processor having an interface to receive packets and classification attributes associated with the packets, the processor supplying processed packets responsive to their respective classification attributes.

13. The system of claim 12 wherein the PPE controller hashes selected packet segments stored in the packet RAM in response to comparing segments in the packet to nodes in the decision tree; and,
wherein the processor includes a plurality of processing engines, the processor managing the order of packets to the processing engines, in response to hashed segment values associated with the packets.

14. The system of claim 11 wherein the PPE controller derives a plurality of classification pointers for a packet; and,
wherein the classification database assigns a plurality of classification attributes to the packet, in response to receiving the plurality of classification pointers.

15. The system of claim 11 wherein the PPE controller makes a comparison between a first reference segment in the packet and node reference segments selected from a group consisting of a second reference segment in the packet and a predetermined segment value stored in the logic tree RAM.

16. The system of claim 11 wherein the second tree level node is a last decision node; and,
wherein the logic tree RAM includes a key node connected to the last decision node via the inter-tree level branches, for accessing classification pointers.

17. The system of claim 16 wherein the PPE controller selects a group of packet segments from the packet RAM, creates a chained packet segment from the group of packet segments, accesses a plurality of chained reference segments from the decision tree RAM, and compares the chained packet segment to the plurality of chained reference segments at a tree level node.

18. The system of claim 16 further comprising:
a UI connected to the packet RAM for selecting segments in a packet to be written.

19. The system of claim 11 further comprising:
a user interface (UI) connected to the decision tree RAM for writing reference segments and comparison operators into a tree level node, selecting the number of tree levels, selecting inter-tree levels branches between nodes on different tree levels, selecting classification pointers for key nodes, and selecting the number of classification pointers per key node.

* * * * *